(12) United States Patent
Jones

(10) Patent No.: US 10,725,926 B2
(45) Date of Patent: Jul. 28, 2020

(54) MANAGING A LIST OF ITEMS STORED IN A CACHE

(71) Applicant: salesforce.com, inc., San Francisco, CA (US)

(72) Inventor: Thomas E. Jones, Alpharetta, GA (US)

(73) Assignee: salesforce.com, inc., San Francisco, CA (US)

( * ) Notice: Subject to any disclaimer, the term of this patent is extended or adjusted under 35 U.S.C. 154(b) by 1 day.

(21) Appl. No.: 16/133,289

(22) Filed: Sep. 17, 2018

(65) Prior Publication Data

US 2020/0089615 A1 Mar. 19, 2020

(51) Int. Cl.
*G06F 3/06* (2006.01)
*G06F 12/0891* (2016.01)
*G06F 12/0864* (2016.01)

(52) U.S. Cl.
CPC ...... *G06F 12/0891* (2013.01); *G06F 12/0864* (2013.01); *G06F 3/067* (2013.01); *G06F 2212/1021* (2013.01)

(58) Field of Classification Search
None
See application file for complete search history.

(56) References Cited

U.S. PATENT DOCUMENTS 9,491,069 B2 * 11/2016 Goldfarb .............. H04L 63/0263
9,742,637 B2 * 8/2017 Goldfarb .............. H04L 63/0263

OTHER PUBLICATIONS

Cache (computing)—Wikipedia URL: https://en.wikipedia.org/wiki/Cache_(computing)#Operation; retrieved on Sep. 6, 2018, 8 pages.
Cache invalidation—Wikipedia URL: https://en.wikipedia.org/wiki/Cache_invalidation; retrieved on Sep. 6, 2018, 2 pages.
Computer data storage—Wikipedia URL:https://en.wikipedia.org/wiki/Computer_data_storage; retrieved on Sep. 6, 2018, 15 pages.
Ilya Grigorik, "HTTP Caching" URL: https//developers.google.com/web/fundamentals/performance/optimizing-content-efficiency/http-caching; retrieved on Sep. 6, 2018, 10 pages.

* cited by examiner

*Primary Examiner* — Brian R Peugh
(74) *Attorney, Agent, or Firm* — Morris & Kamlay LLP

(57) ABSTRACT

A processor can receive a request for a list of items. The request can include a group identifier and search criteria. The search criteria can be configured to return the list of items. The processor can produce, using the group identifier and in response to the request, a determination about a location of a master key associated with the group identifier. The processor can produce, in response to the master key being in the cache, a lookup key. The lookup key can include the master key, the group identifier, and a form of the search criteria. The processor can produce, using a form of the lookup key, a determination about a location of the list of items. The processor can retrieve, in response to the list of items being in the cache, the list of items from the cache.

20 Claims, 9 Drawing Sheets

MANAGING A LIST OF ITEMS STORED IN A CACHE

BACKGROUND

A cache can be a block of memory configured to temporarily store data that can be expected to be used at a frequent rate. To reduce a degree of latency associated with retrieving such data, a location of the cache can be nearer to a processor than a location of a main memory and a capacity of the cache can be less than a capacity of the main memory. Because the data stored in the cache can be expected to be used at a frequent rate, when the processor performs an operation to retrieve such data, the operation can initially search the cache. Having such data found in the cache can be referred to as a cache hit; having such data not found in the cache can be referred to as a cache miss. The data stored in the cache can be a copy of data stored in another memory. In this situation, the other memory can be referred to as a backing store. The copy of the data can be stored in the cache as an entry. The entry can also include a tag. The tag can specify a location of the data in the backing store. An operation to remove or replace an entry from the cache can be referred to as a cache invalidation.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementation of the disclosed subject matter. No attempt is made to show structural details in more detail than may be necessary for a fundamental understanding of the disclosed subject matter and the various ways in which it can be practiced.

DETAILED DESCRIPTION

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

A cache can be a block of memory configured to temporarily store data that can be expected to be used at a frequent rate. To reduce a degree of latency associated with retrieving such data, a location of the cache can be nearer to a processor than a location of a main memory and a capacity of the cache can be less than a capacity of the main memory. Because the data stored in the cache can be expected to be used at a frequent rate, when the processor performs an operation to retrieve such data, the operation can initially search the cache. Having such data found in the cache can be referred to as a cache hit; having such data not found in the cache can be referred to as a cache miss. The data stored in the cache can be a copy of data stored in another memory. In this situation, the other memory can be referred to as a backing store. The copy of the data can be stored in the cache as an entry. The entry can also include a tag. The tag can specify a location of the data in the backing store. An operation to remove or replace an entry from the cache can be referred to as a cache invalidation.

In response to a determination that an entry stored in a cache is for a single item and the single item is invalid, an operation to remove or replace the entry for the single item from the cache can be performed using an identification of the entry. However, in a situation in which an entry stored in a cache is for a list of items, a single item is an element on the list of items, and the element is invalid, the problem can be more difficult. Technologies disclosed herein can address this problem in an environment in which a backing store is configured so that for each instance in which the backing store receives specific search criteria, the backing store returns the same list of items.

Figure 1:
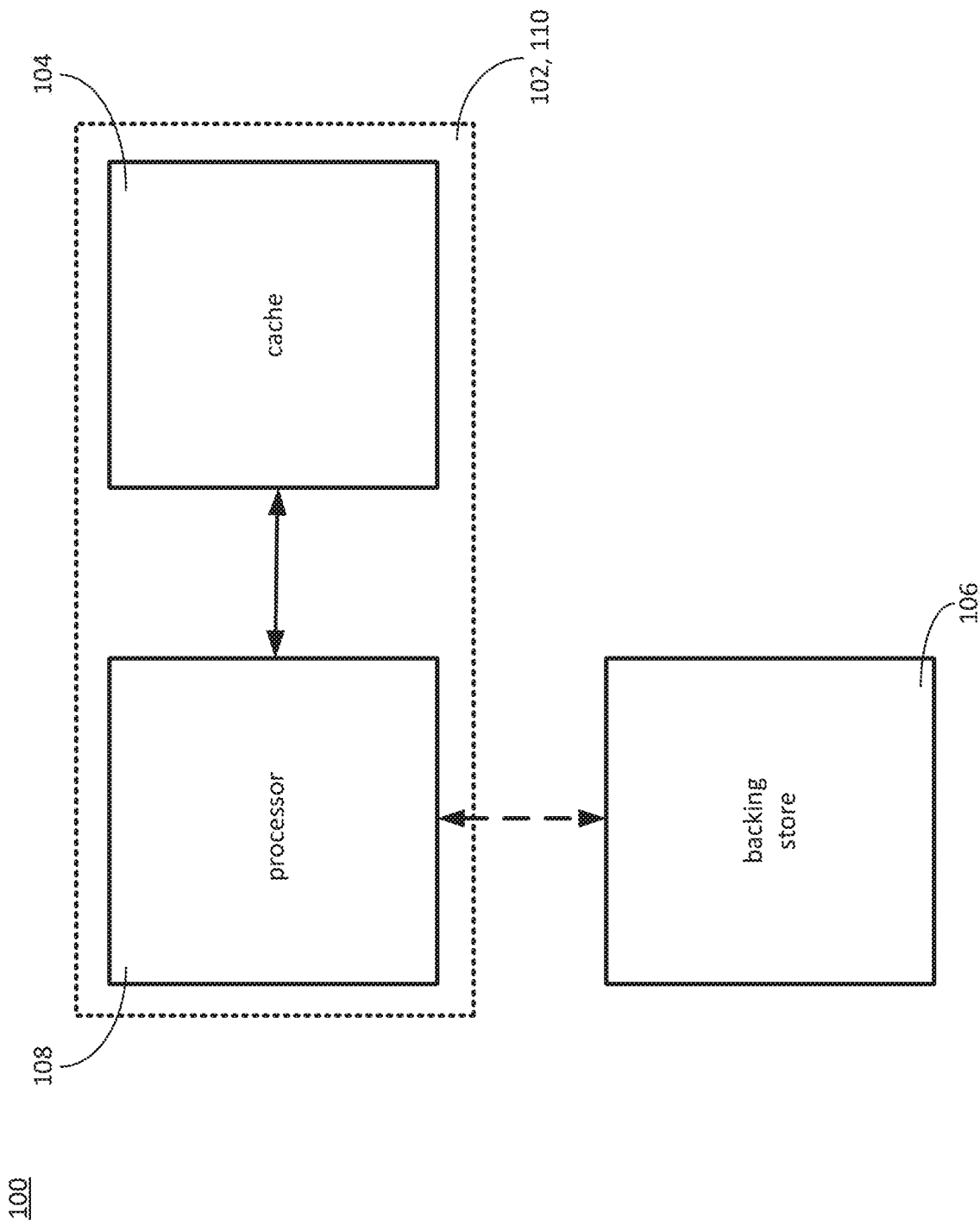
FIG. 1 is a diagram illustrating an example of an environment for a system for retrieving a list of items from a cache and for managing the list of items stored in the cache, according to the disclosed technologies.

FIG. 1 is a diagram illustrating an example of an environment 100 for a system 102 for retrieving a list of items from a cache 104 and for managing the list of items stored in the cache 104, according to the disclosed technologies. The environment 100 can include, for example, the system 102 and a backing store 106. The system 102 can include, for example, the cache 104 and a processor 108. Alternatively, a function of the cache 104 and the processor 108 can be incorporated into a single device 110. The backing store 106 can include, for example, one or more of a main memory, a mass storage device, a removable media drive, a secondary storage, a tertiary storage, or a memory of a server.

Figure 2:
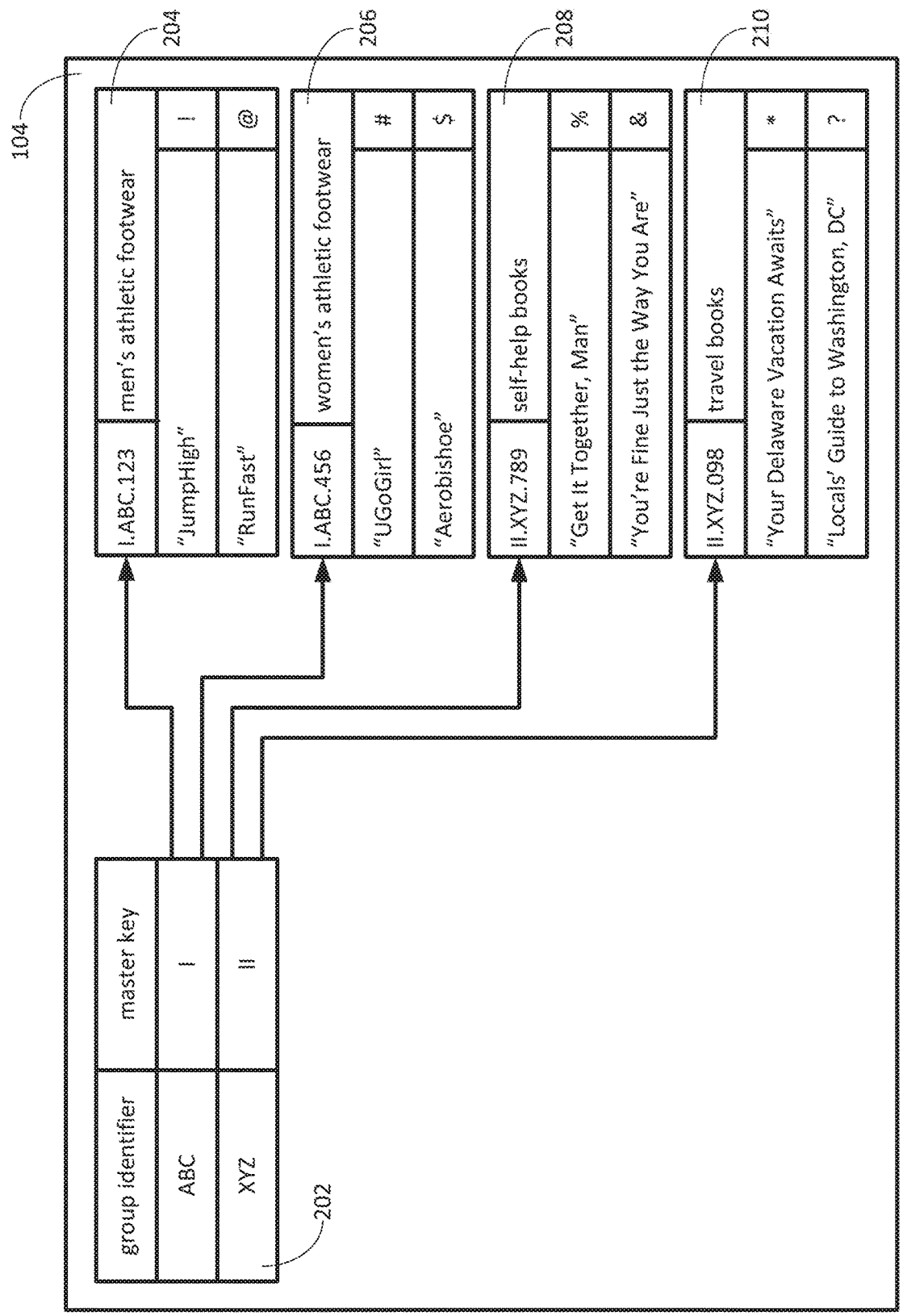
FIG. 2 is a diagram illustrating an example of the cache, according to the disclosed technologies.

FIG. 2 is a diagram illustrating an example of the cache 104, according to the disclosed technologies. The cache 104 can include a table 202 and, for illustrative purposes herein, four entries: a first entry 204, a second entry 206, a third entry 208, and a fourth entry 210. The table 202 can include two columns to cross reference a group identifier with a master key. The group identifier can identify a data group. The data group can be a grouping of similar types of data. For example, the data group can be a grouping of lists of items. For illustrative purposes herein, the cache 104 can include two data groups: "footwear" and "books". The data group for "footwear" can have the group identifier "ABC". The data group for "books" can have the group identifier "XYZ". The data group for "footwear" can be associated, for illustrative purposes herein, with the first entry 204 and the second entry 206. For illustrative purposes herein, the first entry 204 can be for a list of items for "men's athletic footwear" and the second entry 204 can be for a list of items for "women's athletic footwear". The data group for "books" can be associated, for illustrative purposes herein, with the third entry 208 and the fourth entry 210. For illustrative purposes herein, the third entry 208 can be for a list of items for "self-help books" and the fourth entry 210 can be for a list of items for "travel books".

A list of items can include one or more elements. An element can include data about a corresponding item on the list of items. The data can include, for example, a description of a feature of the corresponding item. Optionally, the element can also include a token associated with the data. For illustrative purposes herein, the list of items for "men's athletic footwear" can include two elements: an element for a "JumpHigh" model shoe and an element for a "RunFast" model shoe. Optionally, the element for the "JumpHigh" model shoe can include the token "!" and the element for the "RunFast" model shoe can include the token "@". For illustrative purposes herein, the list of items for "women's athletic footwear" can include two elements: an element for a "UGoGirl" model shoe and an element for an "Aerobishoe" model shoe. Optionally, the element for the "UGoGirl" model shoe can include the token "#" and the element for the "Aerobishoe" model shoe can include the token "$". For illustrative purposes herein, the list of items for "self-help books" can include two elements: an element for a book entitled "Get It Together, Man" and an element for a book entitled "You're Fine Just the Way You Are". Optionally, the element for the book entitled "Get It Together, Man" can include the token "%" and the element for the book entitled "You're Fine Just the Way You Are" can include the token "&". For illustrative purposes herein, the list of items for "travel books" can include two elements: an element for a book entitled "Your Delaware Vacation Awaits" and an element for a book entitled "Locals' Guide to Washington, D.C.". Optionally, the element for the book entitled "Your Delaware Vacation Awaits" can include the token "*" and the element for the book entitled "Locals' Guide to Washington, D.C." can include the token "?".

With reference to FIGS. 1 and 2, the processor 108 can be configured to receive a request for the list of items. The request can include a group identifier and search criteria. The search criteria can be configured to return the list of items. For example, the request can include the group identifier "ABC" and the search criteria "find women's athletic footwear".

The processor 108 can be configured to produce, using the group identifier and in response to the request, a determination about a location of a master key associated with the group identifier. For example, the determination can be that the master key "I" associated with the group identifier "ABC" is located in the cache 104.

The processor 108 can be configured to produce, in response to the master key being located in the cache 104, a lookup key. The lookup key can include the master key, the group identifier, and a form of the search criteria. For example, the lookup key can include the master key "I", the group identifier "ABC", and the search criteria "find women's athletic footwear". Optionally, the processor 108 can be configured to serialize the search criteria. Serialization can be a technique used to convert an original form of data into a string of characters; deserialization can be a technique used to convert the string of characters back to the original form of data. For example, the processor 108 can be configured to serialize the search criteria in response to the master key being located in the cache 104. For example, the search criteria "find women's athletic footwear" can be serialized to "456". The form of the search criteria included in the lookup key can be a serialized form of the search criteria. For example, the lookup key can be "I.ABC.456".

The processor 108 can be configured to produce, using a form of the lookup key, a determination about a location of the list of items. For example, using a form of the lookup key (e.g., "I.ABC.456"), the determination can be that the list of items for "women's athletic footwear" is located in the cache 104. Optionally, the processor 108 can be configured to hash the lookup key. Hashing can be a technique to transform a string of characters into a unique fixed-length value that is shorter than the string of characters. The form of the lookup key used to produce the determination about the location of the list of items can be a hashed form of the lookup key.

The processor 108 can be configured to retrieve, in response to the list of items being located in the cache 104 (e.g., a cache hit), the list of items from the cache 104. For example, the list of items for "women's athletic footwear" can be retrieved from the cache 104. The list of items for "women's athletic footwear" can include two elements: an element for a "UGoGirl" model shoe and an element for an "Aerobishoe" model shoe.

Additionally, the processor 108 can be configured to determine that an element on the list of items stored in the cache 104 is invalid. For example, the element can include first data about a corresponding item on the list of items. The first data can include, for example, a description of a feature of the corresponding item. Optionally, the element can also include a first token associated with the data. For example, the first token can include one or more of a fingerprint of the first data or a hash of the first data. For example, the processor 108 can be configured to determine that the element on the list of items stored in the cache 104 is invalid by receiving a second token associated with second data about the corresponding item and determining that the second token is different from the first token. The second data can include, for example, a description of a feature of the corresponding item. For example, the second token can include one or more of a fingerprint of the second data or a hash of the second data. For example, the second token can be received from the backing store 106. In a configuration, the second token can be received at a periodic rate. For example, the processor 108 can be configured to transmit, to the backing store 106 at the periodic rate, a request for the second token. Additionally or alternatively, the processor 108 can be configured to transmit, to the backing store 106 in response to a determination that second data about the corresponding item has been stored in the backing store 106, a request for the second token.

For example, the processor 108 can be configured to receive a second token "+" associated with data about the "RunFast" model shoe and can be configured to determine that the second token "+" is different from the first token "@" stored in the cache 104. For example, if a feature of the "RunFast" model shoe has changed (e.g., a different pattern on a sole tread), then a description of the feature can change. If the description of the feature has changed and the second data include the description of the feature, then the second token can change (e.g., "+").

The processor 108 can be configured to determine, in response to a determination that the element on the list of items stored in the cache 104 is invalid, the list of items associated with the element on the list of items. For example, in response to a determination that the element for the "RunFast" model shoe is invalid, the processor 108 can determine that the list of items for "men's athletic footwear" is associated with the element for the "RunFast" model shoe.

The processor 108 can be configured to determine, in response to a determination of the list of items associated with the element on the list of items, a master key associated with the list of items. For example, in response to a determination that the list of items for "men's athletic footwear" is associated with the element for the "RunFast" model shoe, the processor 108 can determine that the master key "I" is associated with the list of items for "men's athletic footwear".

The processor 108 can be configured to remove, in response to a determination of the master key associated with the list of items, the master key from the cache 104 (e.g., a cache invalidation). For example, in response to a determination that the master key "I" is associated with the list of items for "men's athletic footwear", the processor 108 can remove the master key "I" from the cache 104. The cache 104 illustrated in FIG. 3 can be an example of the cache 104 with the master key "I" removed.

Figure 3:
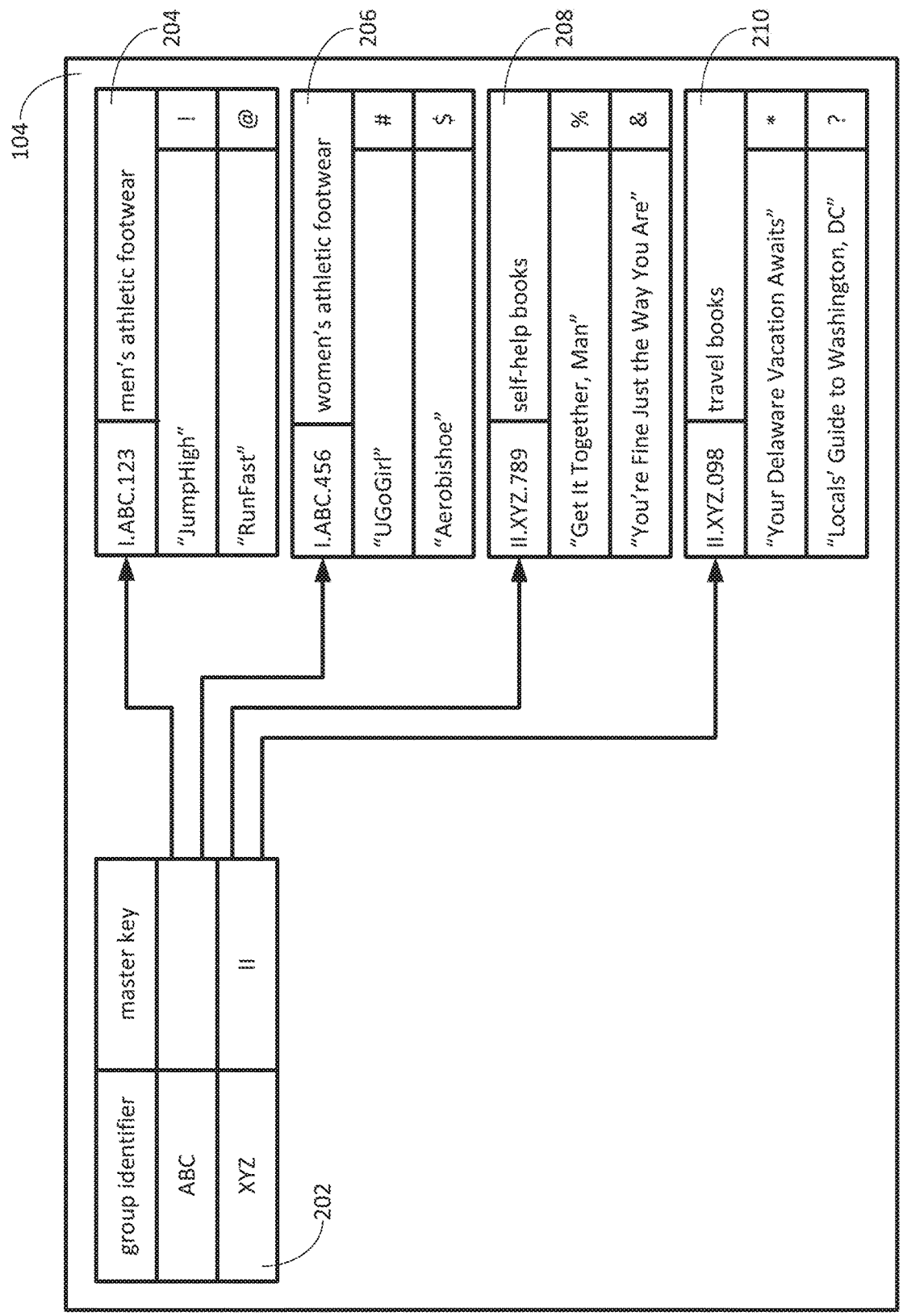
FIG. 3 is a diagram illustrating another example of the cache, according to the disclosed technologies.

With reference to FIGS. 1 and 3, optionally, the processor 108 can be configured to receive a request for the list of items. The request can include the group identifier and search criteria. The search criteria can be configured to return the list of items. For example, the request can include the group identifier "ABC" and the search criteria "find men's athletic footwear".

Optionally, the processor 108 can be configured to produce, using the group identifier and in response to the request, a determination that the master key is not located in the cache 104 (e.g., a cache miss). For example, the determination can be that a master key associated with the group identifier "ABC" is not located in the cache 104.

Optionally, the processor 108 can be configured to retrieve, using the search criteria and in response to the determination that the master key is not located in the cache 104, the list of items from the backing store 106. For example, because in an environment in which the backing store 106 is configured so that for each instance in which the backing store 106 receives specific search criteria, the backing store 106 returns the same list of items, using the search criteria "find men's athletic footwear", the processor 108 can retrieve the list of items for "men's athletic footwear" from the backing store 106. The list of items for "men's athletic footwear" can include two elements: the element for the "JumpHigh" model shoe and the element for the "RunFast" model shoe.

Optionally, the processor 108 can be configured to produce, in response to the determination that the master key is not located in the cache, a unique value. The unique value can be a new master key. The unique value can include one or more of a digital record of a time (e.g., a timestamp), a value of a counter, or a cryptographic value. For example, the processor 108 can produce the unique value by producing the digital record of the time (e.g., the timestamp), by incrementing the counter, or by producing the cryptographic value. For example, the unique value can be "III".

Optionally, the processor 108 can be configured to store the unique value in the cache 104. The group identifier can be a key for the unique value. For example, the unique value "III" can be stored in the cache 104. The group identifier "ABC" can be a key for the unique value "III". The cache 104 illustrated in FIG. 4 can be an example of the cache 104 with the unique value "III" stored in the cache 104.

Figure 4:
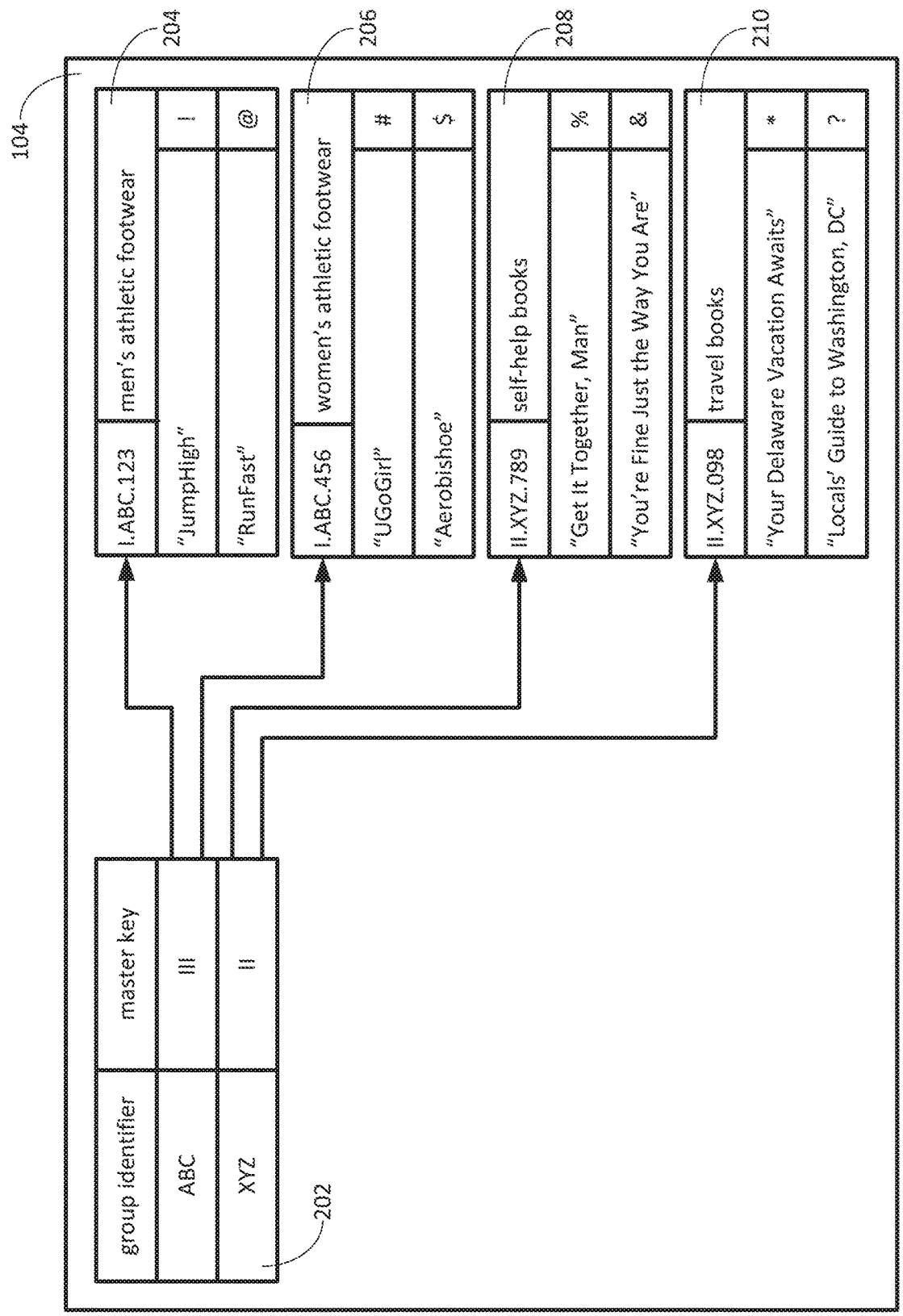
FIG. 4 is a diagram illustrating yet another example of the cache, according to the disclosed technologies.

With reference to FIGS. 1 and 4, optionally, the processor 108 can be configured to determine one or more lists of items associated with the group identifier. For example, the list of items for "men's athletic footwear" can be associated with the group identifier "ABC" and the list of items for "women's athletic footwear" can be associated with the group identifier "ABC".

Optionally, the processor 108 can produce, for each of the one or more lists of items associated with the group identifier, a lookup key. The lookup key can include the master key, the group identifier, and a form of the search criteria. For example, the lookup key for the list of items for "men's athletic footwear" can be "III.ABC.123" and the lookup key for the list of items for "women's athletic footwear" can be "III.ABC.456".

Figure 5:
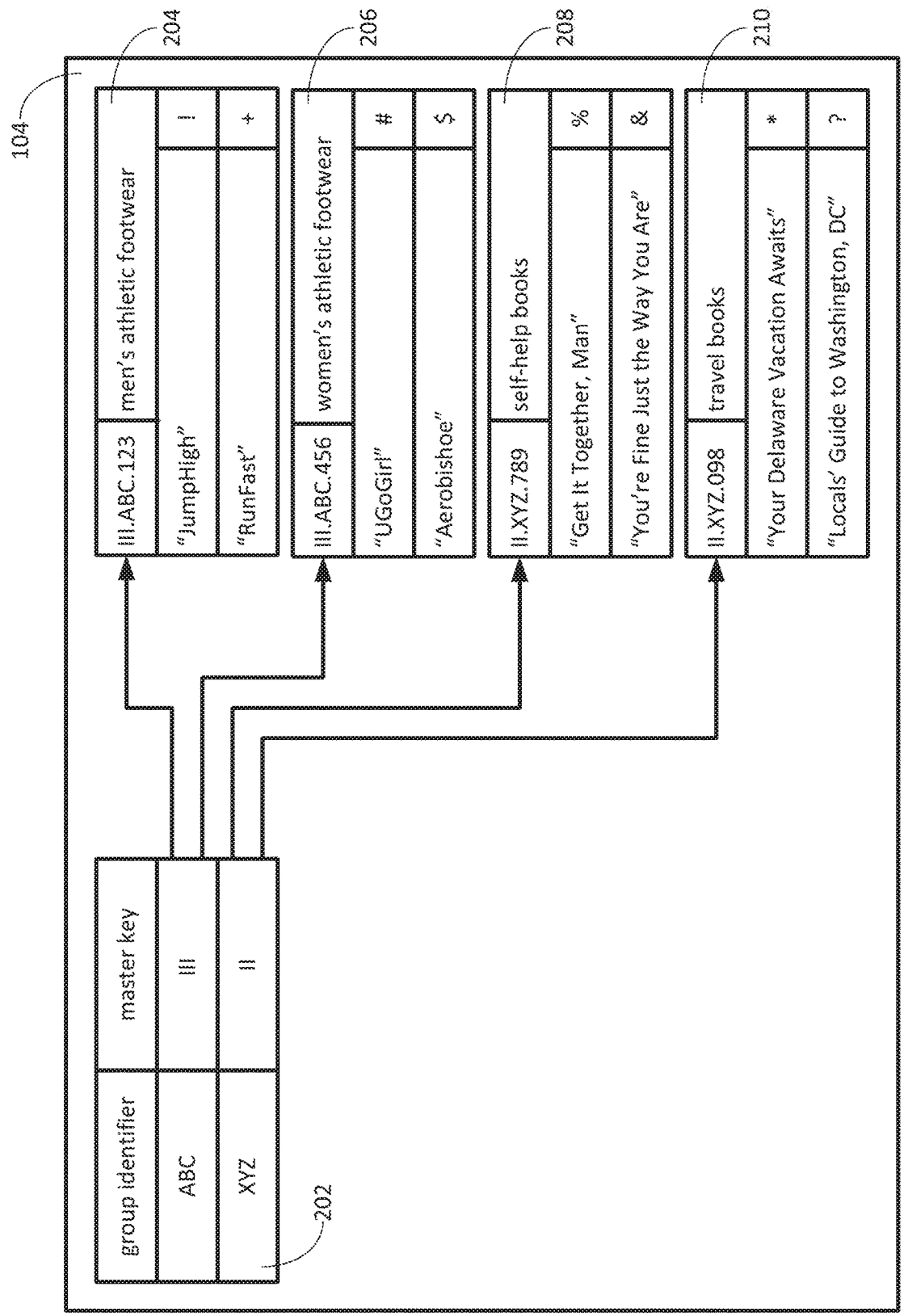
FIG. 5 is a diagram illustrating still another example of the cache, according to the disclosed technologies.

Optionally, the processor 108 can be configured to store, after a retrieval of the list of items from the backing store 106, the list of items in the cache 104. Optionally, the processor 108 can be configured to store, for each of the one or more lists of items associated with the group identifier, the lookup key. The cache 104 illustrated in FIG. 5 can be an example of the cache 104 with the list of items for "men's athletic wear" stored in the cache 104 and the list of items for "women's athletic wear" stored in the cache 104. The list of items for "men's athletic footwear" can include two elements: the element for the "JumpHigh" model shoe and the element for the "RunFast" model shoe. Optionally, the element for the "RunFast" model shoe can include the token "+". For example, the lookup key "III.ABC.123" can be stored with the list of items for "men's athletic footwear" and the lookup key "III.ABC.456" can be stored with the list of items for "women's athletic footwear".

Figure 6:
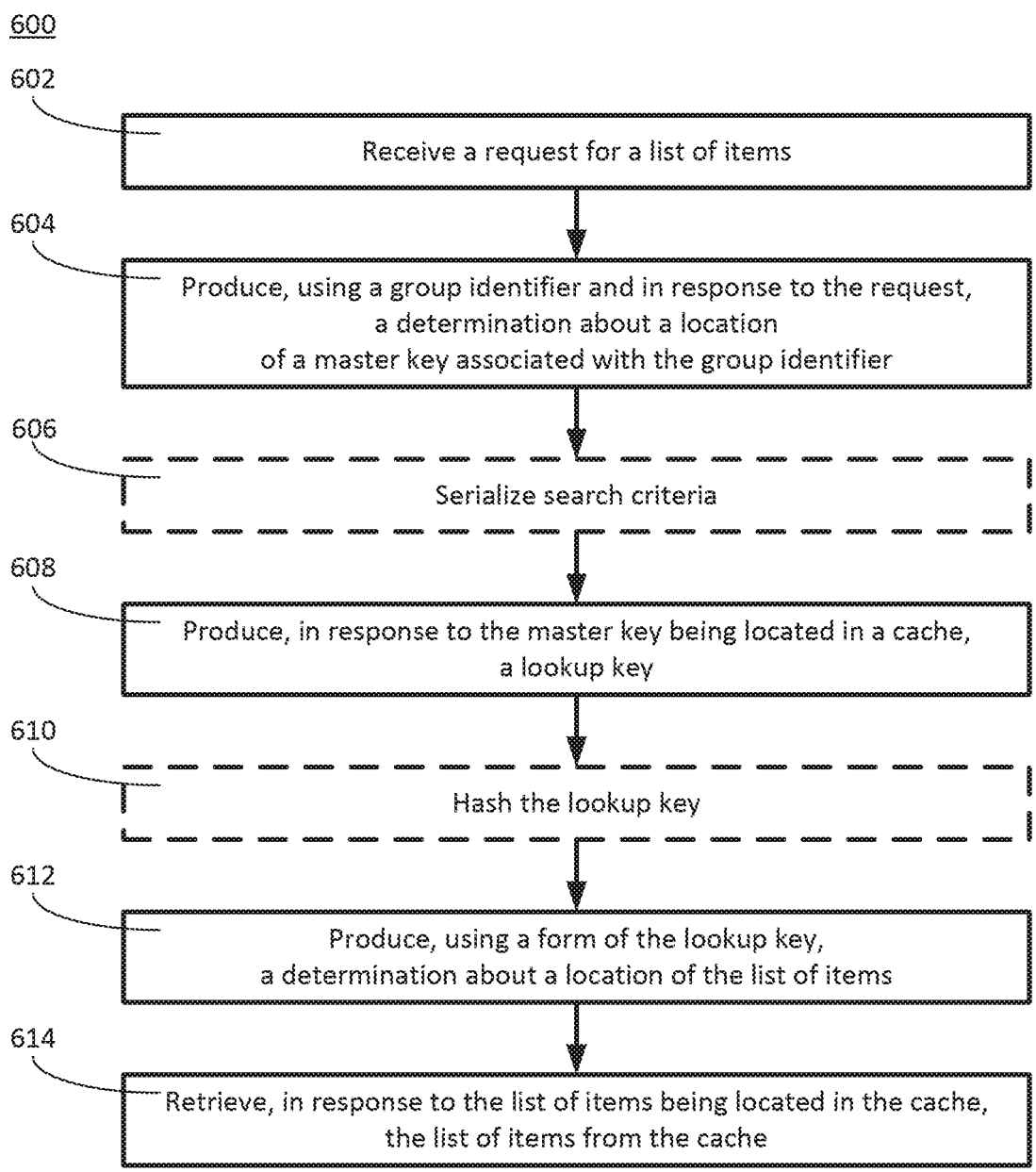
FIG. 6 is a flow diagram illustrating an example of a method for retrieving a list of items from a cache, according to the disclosed technologies.

FIG. 6 is a flow diagram illustrating an example of a method 600 for retrieving a list of items from a cache, according to the disclosed technologies. In the method 600, at an operation 602, a processor can receive a request for the list of items. The request can include a group identifier and search criteria. The search criteria can be configured to return the list of items.

At an operation 604, the processor can produce, using the group identifier and in response to the request, a determination about a location of a master key associated with the group identifier.

At an optional operation 606, the processor can serialize the search criteria. In a configuration, the serializing can be in response to the master key being located in the cache.

At an operation 608, the processor can produce, in response to the master key being located in the cache, a lookup key. The lookup key can include the master key, the group identifier, and a form of the search criteria. In a configuration, the form of the search criteria can include a serialized form of the search criteria.

At an optional operation 610, the processor can hash the lookup key.

At an operation 612, the processor can produce, using a form of the lookup key, a determination about a location of the list of items. In a configuration, the form of the lookup key can include a hashed form of the lookup key.

At an operation 614, the processor can retrieve, in response to the list of items being located in the cache, the list of items from the cache.

Figure 7A:
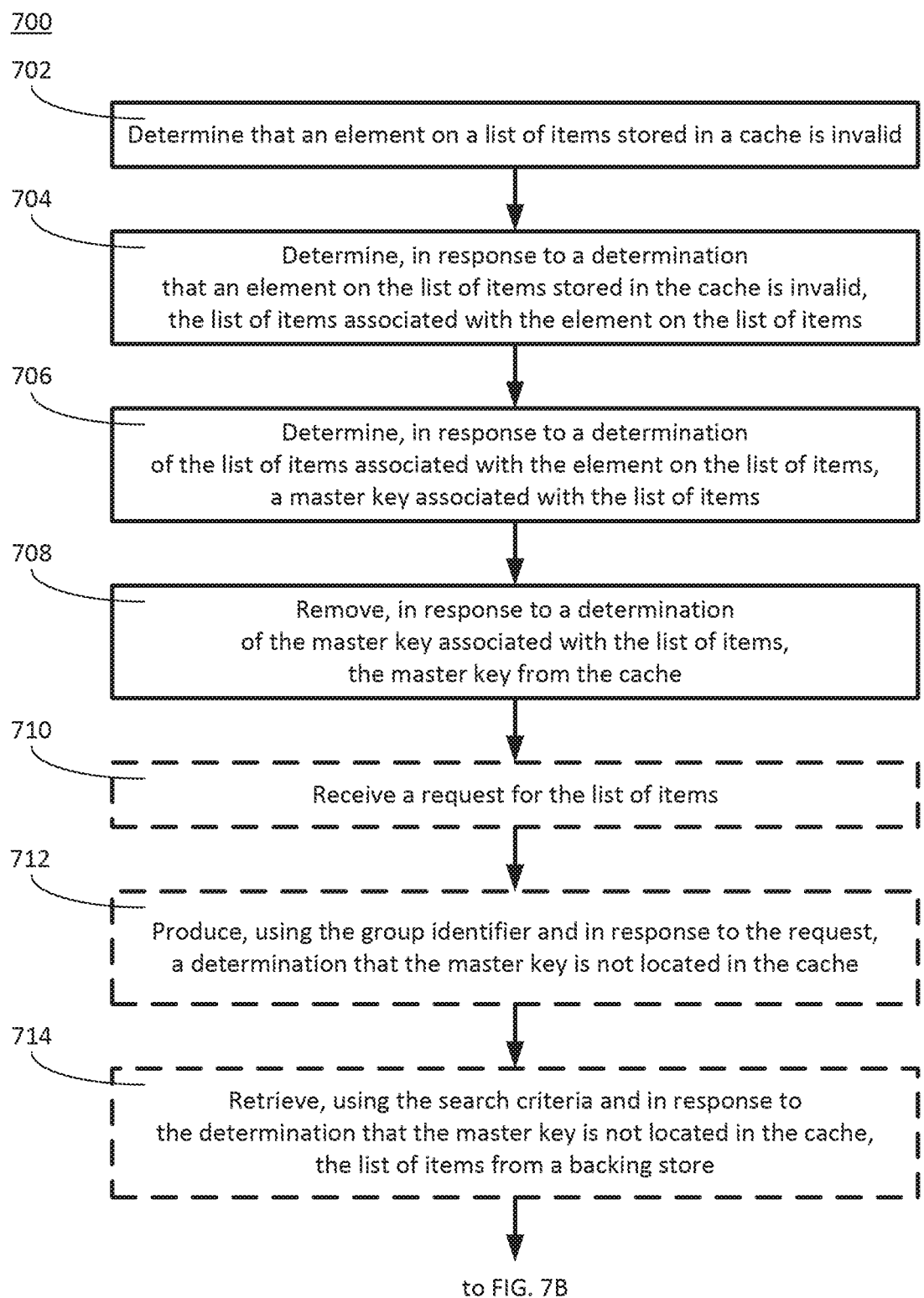
FIGS. 7A and 7B are a flow diagram illustrating an example of a method for managing a list of items stored in a cache, according to the disclosed technologies.
Figure 7B:
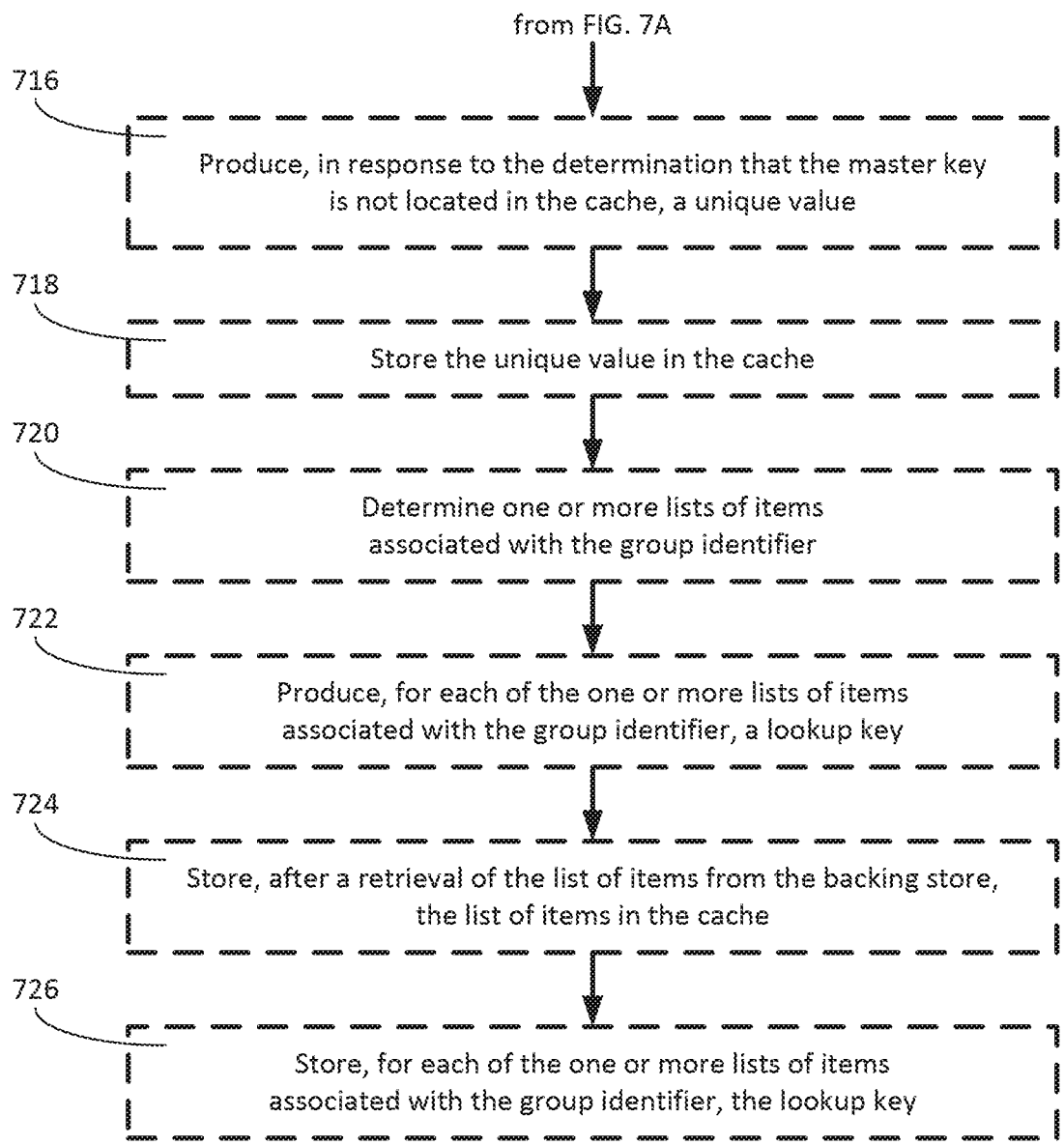
Figure 8:
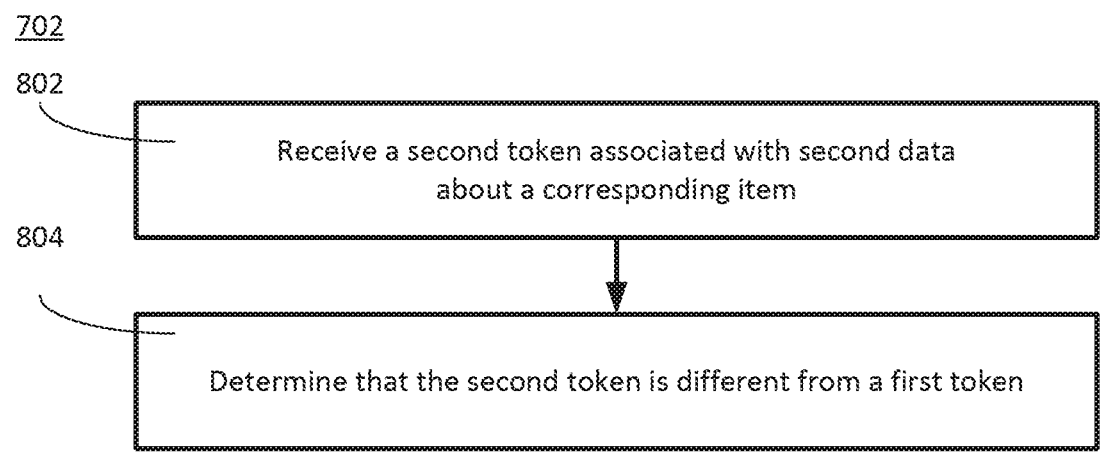
FIG. 8 is a flow diagram illustrating an example of a method for determining that an element on a list of items stored in the cache is invalid.

FIGS. 7A and 7B are a flow diagram illustrating an example of a method 700 for managing a list of items stored in a cache, according to the disclosed technologies. In FIG. 7A, in the method 700, at an operation 702, a processor can determine that an element on the list of items stored in the cache is invalid. For example, the element can include first data about a corresponding item on the list of items. The first data can include, for example, a description of a feature of the corresponding item. Optionally, the element can also include a first token associated with the data. For example, the first token can include one or more of a fingerprint of the first data or a hash of the first data. FIG. 8 is a flow diagram illustrating an example of a method 702 for determining that an element on a list of items stored in the cache is invalid. In the method 702, at an operation 802, the processor can receive a second token associated with second data about the corresponding item. The second data can include, for example, a description of a feature of the corresponding item. At an operation 804, the processor can determine that the second token is different from the first token. For example, the second token can include one or more of a fingerprint of the second data or a hash of the second data. For example, the second token can be received from a backing store. In a configuration, the second token can be received at a periodic rate. For example, the processor can be configured to transmit, to the backing store at the periodic rate, a request for the second token. Additionally or alternatively, the processor can be configured to transmit, to the backing store in response to a determination that second data about the corresponding item has been stored in the backing store, a request for the second token.

Returning to FIG. 7, in the method 700, at an operation 704, the processor can determine, in response to a determination that the element on the list of items stored in the cache is invalid, the list of items associated with the element on the list of items.

At an operation 706, the processor can determine, in response to a determination of the list of items associated with the element on the list of items, a master key associated with the list of items.

At an operation 708, the processor can remove, in response to a determination of the master key associated with the list of items, the master key from the cache.

At an optional operation 710, the processor can receive a request for the list of items. The request can include the group identifier and search criteria. The search criteria can be configured to return the list of items.

At an optional operation 712, the processor can produce, using the group identifier and in response to the request, a determination that the master key is not located in the cache.

At an optional operation 714, the processor can retrieve, using the search criteria and in response to the determination that the master key is not located in the cache, the list of items from the backing store.

In FIG. 7B, at an optional operation 716, the processor can produce, in response to the determination that the master key is not located in the cache, a unique value. The unique value can be a new master key.

At an optional operation 718, the processor can store the unique value in the cache. The group identifier can be a key for the unique value. The unique value can include one or more of a digital record of a time (e.g., a timestamp), a value of a counter, or a cryptographic value. For example, the processor can produce the unique value by producing the digital record of the time (e.g., the timestamp), by incrementing the counter, or by producing the cryptographic value.

At an optional operation 720, the processor can determine one or more lists of items associated with the group identifier.

At an optional operation 722, the processor can produce, for each of the one or more lists of items associated with the group identifier, a lookup key. The lookup key can include the master key, the group identifier, and a form of the search criteria.

At an optional operation 724, the processor can store, after a retrieval of the list of items from the backing store, the list of items in the cache.

At an optional operation 726, the processor can store, for each of the one or more lists of items associated with the group identifier, the lookup key.

Various implementations for retrieving a list of items from a cache and for managing the list of items stored in the cache can include or be implemented in the form of computer-implemented processes and apparatuses for practicing those processes. Implementations also can be implemented in the form of a computer program product having computer program code containing instructions implemented in non-transitory and/or tangible media, such as floppy diskettes, compact disc read-only memories (CD-ROMs), hard drives, universal serial bus (USB) drives, or any other machine readable storage medium, wherein, when the computer program code is loaded into and executed by a computer, the computer becomes an apparatus for practicing implementations for producing an application to process a sequence of operations and for processing the sequence of operations.

Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations for retrieving a list of items from a cache and for managing the list of items stored in the cache.

When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions.

Implementations can be implemented using hardware that can include a processor, such as a general-purpose microprocessor and/or an application-specific integrated circuit (ASIC) that implements all or part of the techniques according to implementations of the disclosed subject matter in hardware and/or firmware. The processor can be coupled to memory, such as random-access memory (RAM), read-only memory (ROM), flash memory, a hard disk or any other device capable of storing electronic information. The memory can store instructions adapted to be executed by the processor to perform the techniques for retrieving a list of items from a cache and for managing the list of items stored in the cache.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, thereby to enable others skilled in the art to utilize those implementations as well as various implementations with various modifications as may be suited to the particular use contemplated.

The invention claimed is:

1. A method for retrieving a list of items from a cache, the method comprising:
   receiving, by a processor, a request for the list of items, the request including a group identifier and search criteria, the search criteria configured to return the list of items;
   producing, by the processor, using the group identifier and in response to the request, a determination about a location of a master key associated with the group identifier;
   producing, by the processor in response to the master key being located in the cache, a lookup key, the lookup key including the master key, the group identifier, and a form of the search criteria;
   producing, by the processor using a form of the lookup key, a determination about a location of the list of items; and
   retrieving, by the processor in response to the list of items being located in the cache, the list of items from the cache.

2. The method of claim 1, further comprising serializing, by the processor, the search criteria, wherein the form of the search criteria comprises a serialized form of the search criteria.

3. The method of claim 2, wherein the serializing is in response to the master key being located in the cache.

4. The method of claim 1, further comprising hashing, by the processor, the lookup key, wherein the form of the lookup key comprises a hashed form of the lookup key.

5. A non-transitory computer-readable medium storing computer code for controlling a processor to cause the processor to retrieve a list of items from a cache, the computer code including instructions to cause the processor to:
   receive a request for the list of items, the request including a group identifier and search criteria, the search criteria configured to return the list of items;
   produce, using the group identifier and in response to the request, a determination about a location of a master key associated with the group identifier;
   produce, in response to the master key being located in the cache, a lookup key, the lookup key including the master key, the group identifier, and a form of the search criteria;
   produce, using a form of the lookup key, a determination about a location of the list of items; and
   retrieve, in response to the list of items being located in the cache, the list of items from the cache.

6. A system for retrieving a list of items from a cache, the system comprising:
   the cache; and
   a processor configured to:
      receive a request for the list of items, the request including a group identifier and search criteria, the search criteria configured to return the list of items;
      produce, using the group identifier and in response to the request, a determination about a location of a master key associated with the group identifier;
      produce, in response to the master key being located in the cache, a lookup key, the lookup key including the master key, the group identifier, and a form of the search criteria;
      produce, using a form of the lookup key, a determination about a location of the list of items; and
      retrieve, in response to the list of items being located in the cache, the list of items from the cache.

7. A method for managing a list of items stored in a cache, the method comprising:
   determining, by a processor, that an element on the list of items stored in the cache is invalid;
   determining, by the processor in response to a determination that the element on the list of items stored in the cache is invalid, a revised list of items associated with the element on the list of items;
   determining, by the processor in response to a determination of the revised list of items associated with the element on the list of items, a master key associated with the list of items; and
   removing, by the processor in response to a determination of the master key associated with the list of items, the master key from the cache.

8. The method of claim 7, wherein:
   the element includes:
      first data about a corresponding item on the list of items; and
      a first token associated with the first data; and
   the determining that the element on the list of items stored in the cache is invalid comprises:
      receiving a second token associated with second data about the corresponding item; and
      determining that the second token is different from the first token.

9. The method of claim 8, wherein:
   the first token comprises at least one of a fingerprint of the first data or a hash of the first data; and
   the second token comprises at least one of a fingerprint of the second data or a hash of the second data.

10. The method of claim 8, wherein the receiving the second token comprises receiving, from a backing store, the second token.

11. The method of claim 8, wherein the receiving the second token comprises receiving, at a periodic rate, the second token.

12. The method of claim 8, wherein at least one of the first data or the second data comprise a description of a feature of the item.

13. The method of claim 7, further comprising:
   receiving, by the processor, a request for the list of items, the request including the group identifier and search criteria, the search criteria configured to return the list of items;
   producing, by the processor, using the group identifier and in response to the request, a determination that the master key is not located in the cache;
   retrieving, by the processor, using the search criteria and in response to the determination that the master key is not located in the cache, the revised list of items from a backing store.

14. The method of claim 13, further comprising:
   producing, by the processor in response to the determination that the master key is not located in the cache, a unique value, the unique value being a new master key; and
   storing, by the processor, the unique value in the cache, the group identifier being a key for the unique value.

15. The method of claim 14, wherein the unique value comprises at least one of:
   a digital record of a time, wherein the producing the unique value comprises producing the digital record of the time;
   a value of a counter, wherein the producing the unique value comprises incrementing the counter; or a cryptographic value, wherein the producing the unique value comprise producing the cryptographic value.

16. The method of claim 14, further comprising:
determining, by the processor, at least one list of items associated with the group identifier; and
producing, by the processor and for each of the at least one list of items associated with the group identifier, a lookup key, the lookup key including the master key, the group identifier, and a form of the search criteria.

17. The method of claim 16, further comprising storing, by the processor after a retrieval of the revised list of items from the backing store, the revised list of items in the cache.

18. The method of claim 17, further comprising storing, by the processor and for the each of the at least one list of items associated with the group identifier, the lookup key.

19. A non-transitory computer-readable medium storing computer code for controlling a processor to cause the processor to manage a list of items stored in a cache, the computer code including instructions to cause the processor to:
determine that an element on the list of items stored in the cache is invalid;
determine, in response to a determination that the element on the list of items stored in the cache is invalid, a revised list of items associated with the element on the list of items;
determine, in response to a determination of the revised list of items associated with the element on the list of items, a master key associated with the list of items; and
remove, in response to a determination of the master key associated with the list of items, the master key from the cache.

20. A system for managing a list of items stored a cache, the system comprising:
the cache; and
a processor configured to:
determine that an element on the list of items stored in the cache is invalid;
determine, in response to a determination that the element on the list of items stored in the cache is invalid, a revised list of items associated with the element on the list of items;
determine, in response to a determination of the revised list of items associated with the element on the list of items, a master key associated with the list of items; and
remove, in response to a determination of the master key associated with the list of items, the master key from the cache.

\* \* \* \* \*